United States Patent [19]

Bergholt

[11] Patent Number: 5,258,580
[45] Date of Patent: Nov. 2, 1993

[54] COMBINATION WEIGHER WITH STAGGER DISCHARGE

[75] Inventor: Steven P. Bergholt, Elgin, Ill.

[73] Assignee: Triangle Package Machinery Company, Chicago, Ill.

[21] Appl. No.: 936,027

[22] Filed: Aug. 26, 1992

[51] Int. Cl.⁵ .......................................... G01G 13/16
[52] U.S. Cl. ................................. 177/25.18; 364/567
[58] Field of Search .................... 177/58, 59, 25.18; 364/567

[56] References Cited

U.S. PATENT DOCUMENTS

| Re. 32,987 | 7/1989 | Naito et al. | 177/25.18 |
| 4,678,046 | 7/1987 | Mosher | 177/25.18 X |
| 4,844,190 | 7/1989 | Mikami et al. | 177/25.18 |

*Primary Examiner*—George H. Miller, Jr.
*Attorney, Agent, or Firm*—Willian Brinks Olds Hofer Gilson & Lione

[57] ABSTRACT

A combination weighing machine that discharges individual batches of product into a collecting hopper in a weight sensitive sequential order and/or in weight sensitive timing between batches order to avoid clogging at the outlet of the collecting hopper and enhances the efficiency, reliability and speed of the machine.

21 Claims, 4 Drawing Sheets

COMBINATION WEIGHER WITH STAGGER DISCHARGE

FIELD OF THE INVENTION

This invention relates generally to a combination weighing machine for providing, from a variety of product sources, a continuous flow of discrete quantities of solid product with each quantity having a predetermined target weight, or a weight very close thereto. More particularly, the invention is an improvement upon known combination weighing machines, which improvement utilizes a weight sensitive staggered discharge logic that enhances the efficiency, reliability and speed of such machines.

BACKGROUND OF THE INVENTION

This combination weighing machine with a weight sensitive staggered discharge is an improvement upon combination weighing machines of the type generally described and claimed in commonly owned U.S. Pat. Nos. 4,630,695 and 4,901,807, the specifications and drawings of which are incorporated herein by reference.

When using a combination weighing machine of the type disclosed in the above referred to U.S. Pat. Nos. 4,630,695 and 4,901,807, a target package weight is preselected. Fractional amounts of the target package weight, which shall be referred to as product batches, are metered through a plurality of product batch handling units. Each separate product batch handling unit includes, in addition to other components, a radially extending product feeder trough, an accumulation chamber and a weighing device. The weighing device weighs the product batch that has been metered to it and records the weight; the weighed product batch is stored either in a weigh bucket associated with the weighing device or in a holding chamber disposed there below.

Some combination weighing machines discharge the selected product batches into a collecting hopper directly from the weigh bucket of each weighing device. Other combination weighing machines have a plurality of compartments, coinciding with each weighing device, that each store a product batch and from which the selected product batches are chosen. When a plurality of such compartments are used, they are referred to as holding chambers. The terms holding chamber or holding chambers, when used in this application, shall mean the compartment or compartments from which the product batches are fed to the collecting hopper.

The weight of the product batch that is metered to the weighing device can be controlled, for example by controlling the feed time for the conveying mechanism that meters out product to the product batch handling units. When a complete set of product batches has been weighed, recorded and stored, then combination weights are calculated and compared to the target package weight.

The term "best combination" as used in the combination weighing machine art and as used herein means the combination that best meets predefined specifications. The predefined specifications will be different for different products and can be inputted into the machine. For example a package that is stated to contain 8 ounces of product, may have predefined specifications as follows: Target weight equals 8 ounces, minus limits equals 0 ounces, and plus limit equals 1 ounce. With such predefined specifications the "best combination" would have a weight of at least 8 ounces but less than 9 ounces. If no combination fulfills these specifications then a machine signal is given.

It should be noted that in large combination weighing machines, there may be a population of many thousands of possible combinations. Some subsets within this population are very unlikely to include acceptable combinations and could be eliminated from consideration without affecting the results. Furthermore, it has been found that it is not necessary to generate the complete population of possible combinations to be assured of obtaining an acceptable combination. Also, the time required to generate the complete population of combinations slows the overall operation of the machine. In such situations, strategies can be developed to generate a subset of the complete population, with the assurance that an acceptable combination will be available. A best combination is then selected from the subset of generated combinations. The term "best combination" as used herein shall apply to such a combination even though not all possible combinations were generated.

A best combination, that fulfills the above criteria, is selected. The selected holding chambers are discharged into a collecting hopper for the formation of a package. The discharged holding chambers are then replenished and the cycle of selecting another acceptable combination is repeated. The discharge, of the selected holding chambers, into a collecting hopper can be done simultaneously or it can be staggered.

Prior art combination weighing machines are of two general types, in-line and radial. The in-line type machines have the weighing devices arranged side by side along a line. The radial type machines have the weighing devices arranged around a circle. Both of the above identified U.S. Pat. Nos. 4,630,695 and 4,901,807 disclose in-line type combination weighing machines. U.S. Pat. No. 4,901,807 also discloses a radial type combination weighing machine.

Combination weighing machines frequently have a funnel shaped collecting hopper disposed so as to receive the combination of product batches having the target weight. All discharged product batches travel substantially the same distance to the outlet of such a funnel shaped collecting hopper. This can result in product jams, bridging or blocking at the outlet. By staggering the discharges of the product batches, such that all batches do not converge on the collecting hopper at the same time, the likelihood of blockages can be reduced. Staggered discharge is known in the prior art. However, available staggered discharge systems have not completely resolved the problem. Current combination weighing machines can produce more than 100 discrete quantities of product per minute. Thus, the total discharge time that is available for the product of one package is but a fraction of a second. As a result, even with a staggered discharge, product batches may overlap in flowing through the outlet of the collecting hopper, and result in blockages.

Heretofore, it has been known to use plural net weighing machines to produce packages that include two or more different ingredients. In packaging systems of this type, each net weighing machine weighed out a batch of a single ingredient and the machine was programmed to discharge its individual batches in predetermined, timed sequence into a common collecting hopper. In some such machines, it was desired that the different ingredients be layered in the package; in others, the denser ingredient was deposited at the top of the product and was expected to disperse itself downwardly throughout the less dense ingredient below it; while in others, the final discharge into the package was a dribble feed to top off the package to its target weight.

The sequential discharge of product batches is also old in the combination weighing machine prior art U.S. Pat. No. 4,385,671 discloses a combination weighing machine. In the preferred embodiment of this patent, the selected batches are discharged simultaneously into a collecting hopper; however, in another embodiment, the selected batches are indicated by pilot lamps and an operator manually unloads the selected batches sequentially rather than simultaneously. U.S. Pat. Nos. 4,467,880 and 4,574,897 also disclose combination weighing machines having sequential discharge of the selected batches of product. However, none of these prior art combination weighing machines discloses the concepts of ordering or timing the sequential discharge on the basis of the weights of the selected batches.

It is a primary objective of the present invention to provide a combination weighing machine that is more reliable as a result of having a weight sensitive sequential discharge of the product batches making up the total package.

Another primary objective of the present invention is to provide a combination weighing machine that is more reliable as a result of the timing between discharges being weight sensitive.

Still another primary objective of the present invention is to provide a combination weighing machine that is more reliable as a result of having a weight sensitive sequential discharge in combination with the timing between discharges being weight sensitive.

Another objective of the present invention is to reduce the total time required to discharge the selected batches by discharging the batches sequentially in a weight sensitive order with either an equal or variable time delay for each batch.

Still another objective of the present invention is to increase the efficiency of present combination weighing machines by discharging the selected batches into a collecting hopper in an order based upon the weight of the selected batches.

SUMMARY OF THE INVENTION

To achieve these and other objectives, the present invention provides a new logic for controlling the discharge of the selected holding chambers, that causes the batches to be discharged in a weight sensitive sequence after either equal or variable time delays.

A preferred embodiment of the invention includes a logic that provides longer time delays after the discharge of heavier batches than after the discharge of lighter batches and orders the sequences in various manners related to batch weight.

An advantage of the present invention is that blockages in the collecting hopper are avoided and the combination weighing machine becomes more efficient and reliable.

Another advantage of the present invention is that it decreases down time for the combination weighing machine by reducing the likelihood that the machine will choke or jam, which requires the machine to be shut down to clear the jam.

Still another advantage of the present invention is that as a result of the weight sensitive staggered discharge the total discharge time for a target weight product is reduced, thus decreasing the cycle time on the machine.

These and other objects and advantages of the present invention will become apparent to those skilled in the art from the following detailed description of the preferred embodiment, the accompanying drawings and the claims.

DETAILED DESCRIPTION OF THE PREFERRED EMBODIMENT

Figure 2:
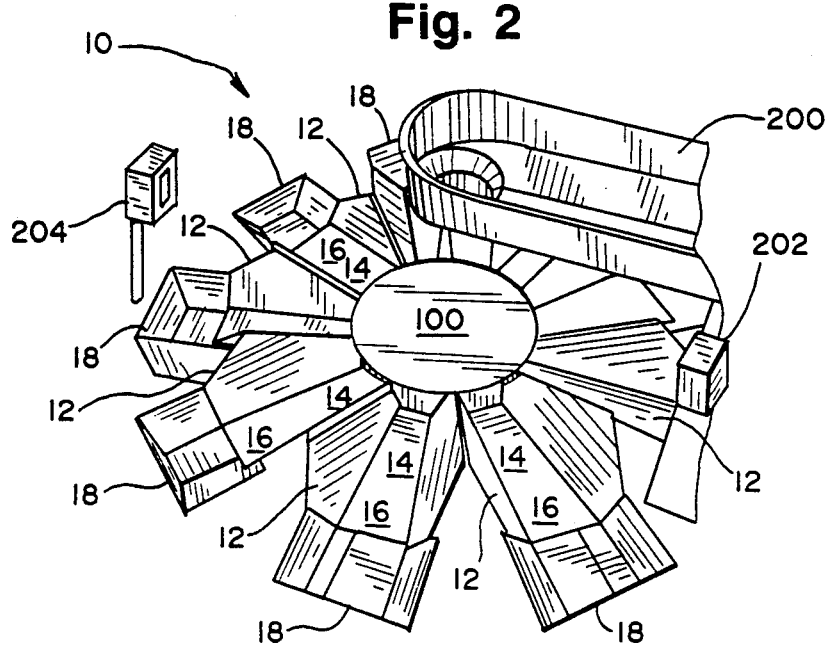
FIG. 2 is a perspective view looking down on the radial combination weighing machine of FIG. 1.
Figure 1:
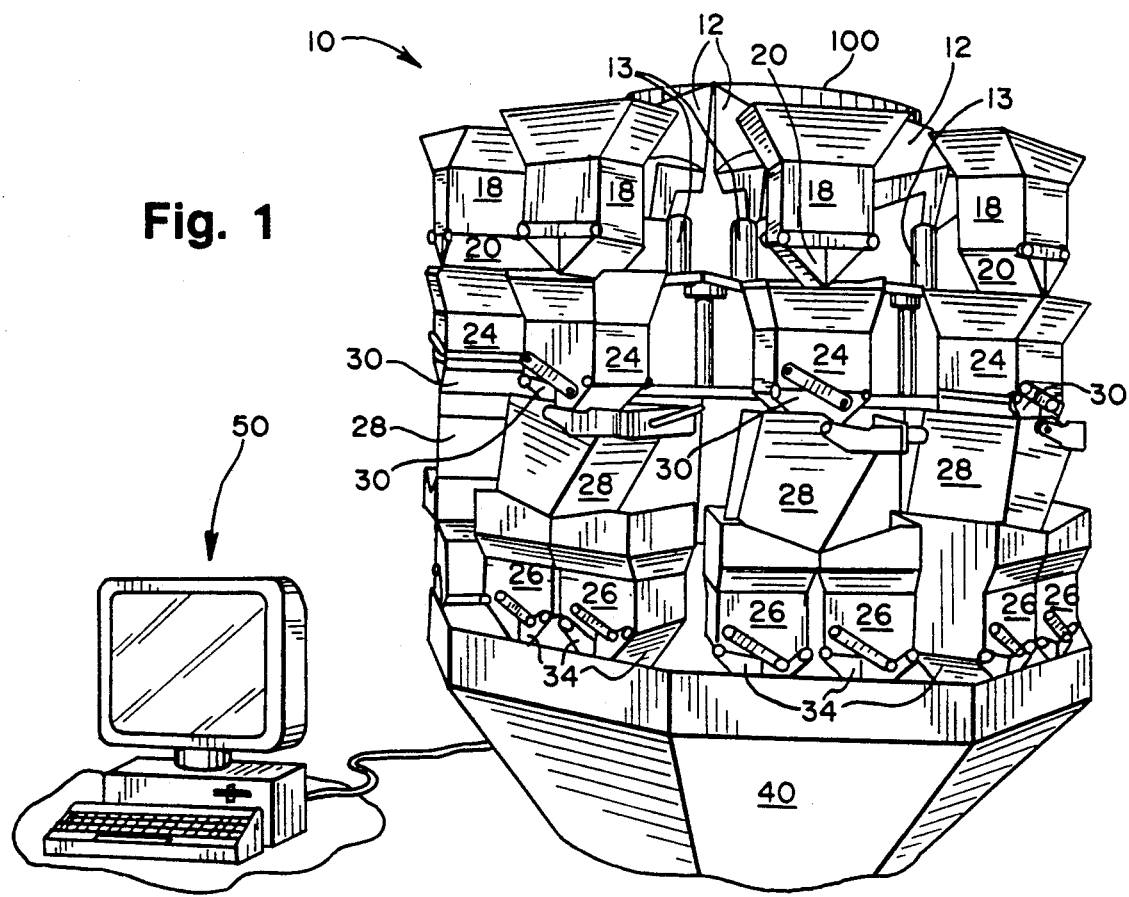
FIG. 1 is a perspective view of a radial combination weighing machine.

Referring to FIGS. 1 and 2, there is shown a radial combination weighing machine 10 of the type in which the preferred embodiment of this invention is intended to be used. Although, the preferred embodiment of this invention is shown in a radial combination weighing machine it is also intended for use with in-line type combination weighing machines.

FIG. 2 is a view looking down on the top of the radial combination weighing machine 10 of FIG. 1 and shows a discharge spout 200 for an external bulk product source. The discharge spout 200 is located such that a stream of bulk product can be fed to and deposited at the center of the machine's nutating distribution device which is in the form of a disc 100. The external bulk product source is automatically cycled on and off in response to sensing devices 202 and 204 that respond to the level of product on the distribution disc 100. It will be appreciated that other feeding apparatus may be used within the teachings and scope of this invention. The nutating drive is not a part of the present invention or the prior art; rather, such nutating drive is disclosed and claimed in commonly owned and pending application Ser. No. 07/943,409, filed Sep. 9, 1992, the disclosure of which is incorporated herein by reference.

As seen in FIG. 1, a computer system 50 functions as the machine control mechanism to monitor and control various components of the combination weighing machine 10 as well as related packaging machinery. For example, the computer system 50 can be programmed to energize or de-energize the bulk product source in response to signals from sensing devices 202 and 204, to open or close a set of doors for a particular accumulation chamber 18, weigh bucket 24, or holding chamber 26, or to position a diverter 28. The computer system's board includes input and output ports for connecting input and output devices such as a keyboard or a touch screen. The computer system 50 receives information regarding the weight of the product in the holding chambers and the status of various components of the combination weighing machine 10 from various sensing devices. Other information is supplied to the computer system 50 through software programs and data files. This may include information unique to the product being weighed, the target weight, the range of acceptable weights, the length of time or amplitude of vibration for the feeder trays, or other characteristics of the product being weighed. The computer system 50 is programmed to function as a combination computing and selecting unit for carrying out the various calculations and to select a best combination of product batches having a total weight that satisfies predetermined conditions. The combination computing and selecting unit is programmed to determine how many batches are included in the best combination, which data it uses to determine the delay time between the commencement of batch discharges. The above mentioned functions of the computer system 50 are currently performed in the prior art machines.

The computer system 50 also functions as a discharge control unit to sequentially discharge the stored batches making up the best combination in either a weight sensitive order, or in a weight sensitive timing sequence. Performance of this function requires a modification of existing software since this function incorporates the new logic of this invention. The software must, for example, be modified to label the product batches of the best combination as heaviest, next to heaviest, lightest, next to lightest, etc. The software must also be modified such that when a total discharge time for each package has been determined it can be established in the software by inputting the value into the computer system 50, and for causing the number of product batches that are included in the selected best combination to be counted and this number stored for future use in calculating the delay time between batches.

All of the hardware of computer system 50 is used in commercially available prior art combination weighing machines of the type disclosed in the above referred to U.S. Pat. Nos. 4,630,695 and 4,901,807. However the new logic of this invention may be written into the software that runs on the hardware of computer system 50. Alternatively, the hardware may be redesigned by those skilled in hardware design and having the benefits of the teachings herein.

The distribution disc 100 is driven continuously, and its nutating motion imparts radial movement to product that is deposited on the distribution disc 100. A plurality of radially extending product feeder troughs 12 are mounted on the machine frame such that their receiving ends 14 underlie the periphery of the distribution disc 100. The radial movement imparted to the product that has been deposited on the distribution disc 100 causes the product to fall into the receiving ends 14 of the product feeder troughs 12. The product feeder troughs include electrically driven vibrators 13 that are cycled on and off at appropriate times by the computer system 50. The individual drives for the product feed troughs 12 are cycled on after a corresponding holding chamber has been selected and discharged to form a package. There is an accumulation chamber 18 at the discharge end 16 of each product feeder trough 12. The product feeder troughs 12 are programmed to remain on for a predetermined time during which product advances along the trough from the receiving end toward the discharge end 16 and into an accumulation chamber 18. The product feed troughs 12, which are cycled on and off, thus feed an initial batch of product to the accumulation chamber 18. The approximate weight or amount of this initial product batch can be controlled by adjusting the time period that the product feed troughs 12 remain on. Such an adjustment can be made by a keyboard or touch screen input to the computer system 50. The accumulation chambers 18 include doors 20 that can be opened and closed by mechanical or electromechanical devices. Each electro-mechanical device is independently controlled by the computer system 50 such that each set of doors 20 act independently of the doors on the other accumulation chambers 18. It should be noted that although the accumulation chambers, weigh buckets and holding chambers disclosed herein each have a set of discharge doors a single door design could be used in place of the double door design. When the term "door" is used herein to define the discharge means for the accumulation chambers, weigh buckets or holding chambers it should be interpreted to means either a single or multiple door design.

The accumulation chambers 18 discharge into weigh buckets 24 which are associated with a weighing means. The weighing means determines the weight of the product batch, and functions as a transmitter for sending the measured weight in digital form to be stored in the memory of the computer system 50. The weigh buckets 24 have doors 30 controlled by mechanical or electromechanical devices that are independently actuated by the computer system 50. A diverter 28 is located below the doors 30 of each weigh bucket 24. Diverters 28 can be positioned by mechanical or electro-mechanical devices to direct the product from the weigh bucket 24 into the proper holding chamber 26. There are two holding chambers 26 disclosed for each product batch handling unit. Each holding chamber 26 has a set of doors 34 that are controlled by a mechanical or electromechanical device, which can be energized by the computer system 50 at the appropriate time in the cycle. When door 34 of a holding chamber 26 is opened the product batch stored in that holding chamber 26 is discharged into the collecting hopper 40. In accordance with this invention, the order in which a particular set of doors 34 is opened and the time sequence between the previous and or the next set of door openings is controlled by the new logic of this invention.

The new logic of this invention is particularly beneficial when the product or product condition results in widely varying weights of the product batches making up the best combination. For example, if two of five of the selected product batches contain 75% of the package weight and these two product batches are discharged simultaneously or staggered, but following each other, then a choke or blockage is likely to occur. Although this new logic is most useful in the above described situation, it can be installed and used in all situations and can reduce the total cycle time for forming most packages. The new logic includes a default order that will be applied in the event that all or some product batches have identical weights.

Another embodiment of combination weighing machine 10 discharges the weighed product batches directly from the weigh buckets 24 into the collecting hopper 40. In this second embodiment, the diverters 28 and the holding chambers 26 along with their operating mechanisms have been eliminated. As has been previously stated, the terms holding chamber or holding chambers when used in the claims of this patent should be interpreted to mean the compartment or compartments from which the product batches are fed to the collecting hopper 40.

Figure 3:
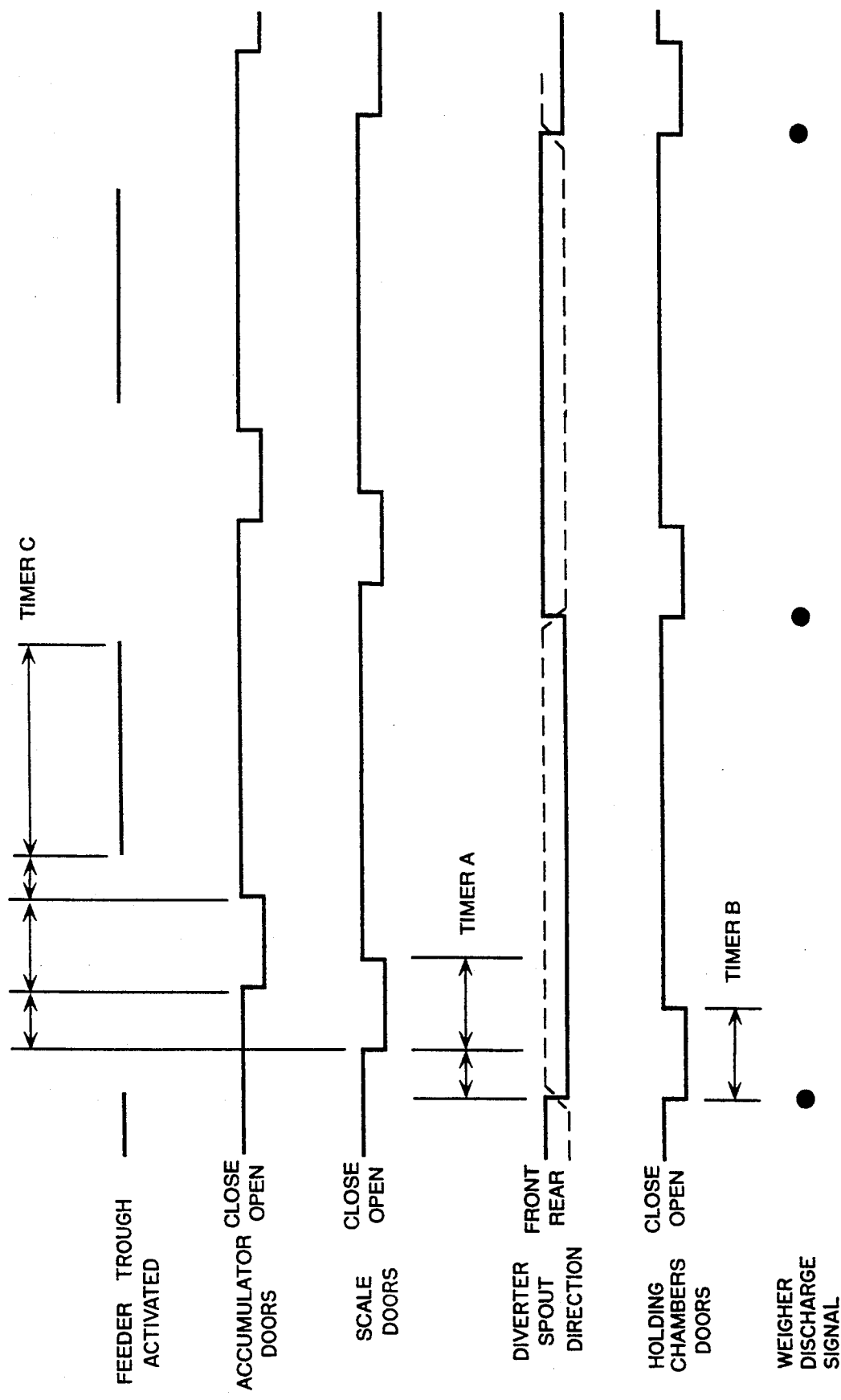
FIG. 3 is a time diagram of various timers that are part of the logic of the combination weighing machine of the present invention.

Referring now to FIG. 3, a general explanation of the logic, or how a combination weighing machine is programmed, follows. This discussion will begin at the point in the sequence when the "WEIGHER DISCHARGE SIGNAL" is given, which occurs after the best combination has been selected. The WEIGHER DISCHARGE SIGNAL is indicated by a black dot in the last line of FIG. 3. When the WEIGHER DISCHARGE SIGNAL is received several things are initiated. First the appropriate holding chamber doors are caused to open. Second, it causes the diverter spout to swing to the front or rear, and third it starts Timers A and B. Timer B times the duration that holding chamber doors 34 are open. Timer B is affected by the change in logic of this invention. In combination weighing machines that do not utilize a staggered discharge all holding chambers open and close at the same time and thus the duration of time that the holding chamber doors remain open is equal for all holding chamber doors that are opened in the formation of a package. In all embodiments of the subject invention all holding chamber doors open at different times but all close at the same time. In the embodiment depicted in FIG. 5, the duration of time that the holding chamber doors remain open decreases by 0.05 seconds from one batch to the next. In the embodiment depicted in FIG. 6, the duration of time that the holding chamber doors remains open, other than for the first and last batch, depends upon the duration of the variable time delays. A third embodiment combines the weight sensitive order of the FIG. 5 embodiment with the weight sensitive discharge timing of the FIG. 6 embodiment.

Timer A is programmed for two consecutive time intervals, the first being a time delay period following the WEIGHER DISCHARGE SIGNAL before the scale doors 30 open, and the second being the time duration that doors 30 remain open.

Timer A activates Timer C when the scale doors 30 open. Timer c has four consecutive intervals: the first interval being a delay period until the accumulation chamber doors 20 open; the second interval being the time interval that accumulation chamber doors 20 remain open; the third being a time period delay before initiating vibration of the feeder trays 12; and the fourth interval being the time duration that the feeder trays are vibrated.

Figure 4:
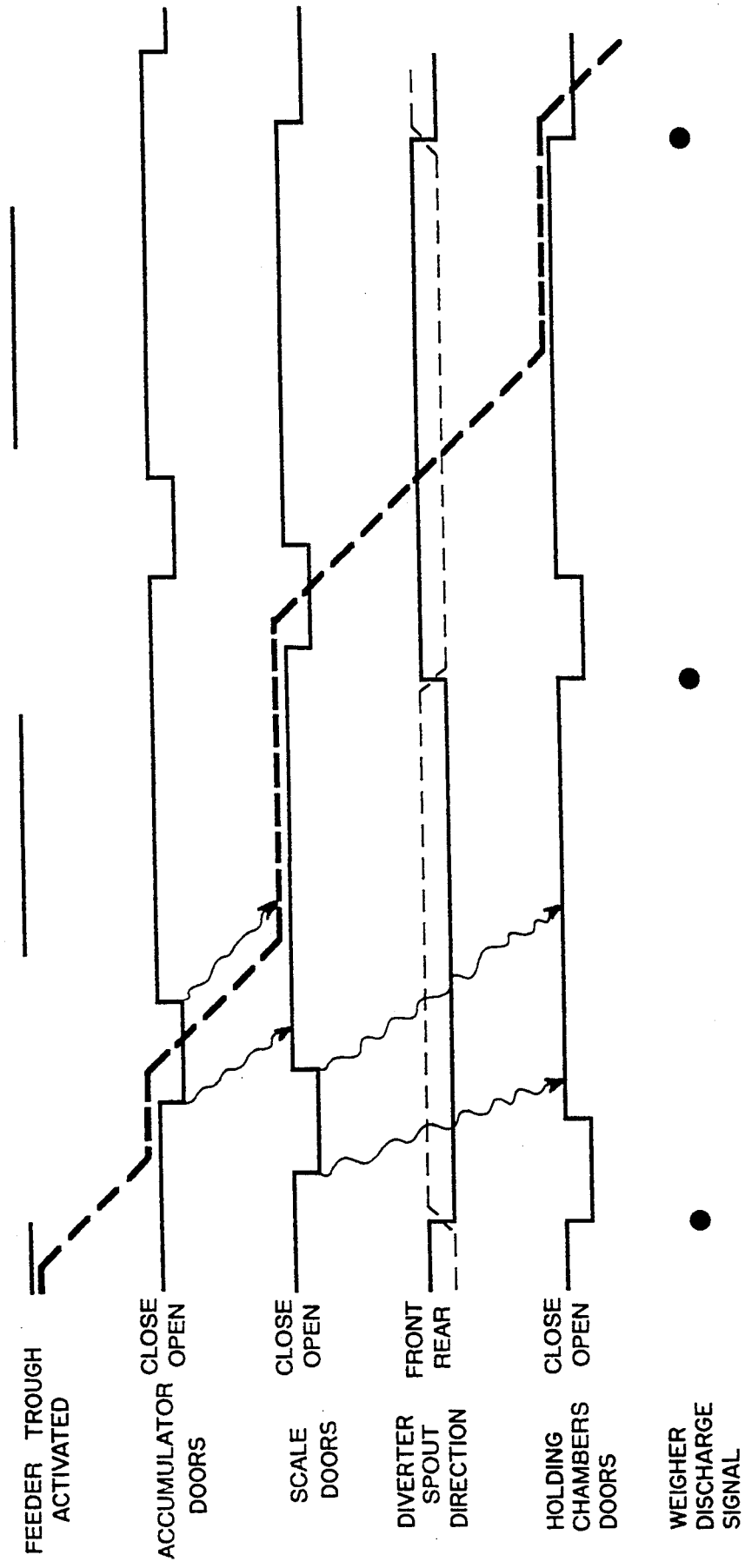
FIG. 4 is a time diagram used to illustrate and describe the path of a single piece of product through the batch handling sequence.

The various delays discussed with reference to FIG. 3 can be best understood by following a single piece of product as it progresses through the product batch handling unit. In FIG. 4, the wavy lines indicate product falling from the accumulation chambers 18 to the scale or weigh bucket 24 and from the scale through the diverter spout 28 to the holding chambers 26.

It should be noted that the scale doors open before the holding chamber doors close, and the accumulation chamber doors open before the scale doors close. It takes the product a certain time to fall from the scale doors 30 to the bottom of an holding chamber and from the accumulation chamber doors 20 to the bottom of the weigh bucket. Before these certain time periods have elapsed the holding chamber doors 34 and the scale doors 30 will have closed. This is a good example of the precision timing that is required in modern combination weighing machines. In FIG. 4, the heavy dashed line represents a typical pathway for a single piece of product through a product batch handling unit of a combination weighing machine.

In accordance with the logic of this invention, the product batches, selected as the best combination, are discharged into the collecting hopper 40 in a timed sequence such that the amount of product passing through the outlet of the collecting hopper will be uniform throughout the available stagger discharge time. The sequence of the holding chambers discharge is dependent upon the weight of product in each of the batches making up the best combination. The selected holding chambers should be sorted by weight in descending order, that is the heaviest holding chamber first and the lightest holding chamber last. A sorting such as this facilitates the process of selecting the heaviest, lightest, second heaviest, holding chamber and so on. If, for example, the best combination is composed of five (5) holding chambers then, according to a preselected discharge order, the heaviest holding chamber is discharged first, the lightest second. The next to the heaviest chamber is discharged last, and the next to the lightest chamber is discharged next to last. This of course leaves one holding chamber that will be discharged third. If the best combination had been made up of six (6) holding chambers, then the logic would have been continued, and the third heaviest holding chamber would have been discharged third and the third from the lightest holding chamber would have been discharged fourth. The sequence is of course continued until all holding chambers included in the best combination have been discharged. It should be understood that, while this example follows one pre-selected discharge order, other pre-selected discharge orders could be used.

In a first embodiment of the new logic of this invention the time delays between discharges are equal. In this embodiment the total stagger discharge time S must be determined and inputted into the computer system 50. Since there is no delay after the last holding chamber is discharged, the total discharge time S is divided by the number of holding chambers making up the best combination minus one. For example, if a total discharge time S of 0.2 seconds was inputted into the computer system 50 and the selected best combination is made up of five (5) holding chambers, then 0.2 seconds is divided by 4 (5-1) and an equal time delay ETD of 0.05 seconds is established. Instructions to make this calculation may be written into the software that runs on the computer system 50. In accordance with this embodiment, there would be a time delay of 0.05 seconds after the heaviest holding chamber is discharged before the lightest holding chamber is discharged and then another time delay of 0.05 seconds until the third holding chamber is discharged. It should be understood that this invention is not limited to the use of this precise formula since other equivalent formulas that accomplish substantially the same results can similarly be devised.

Figure 5:
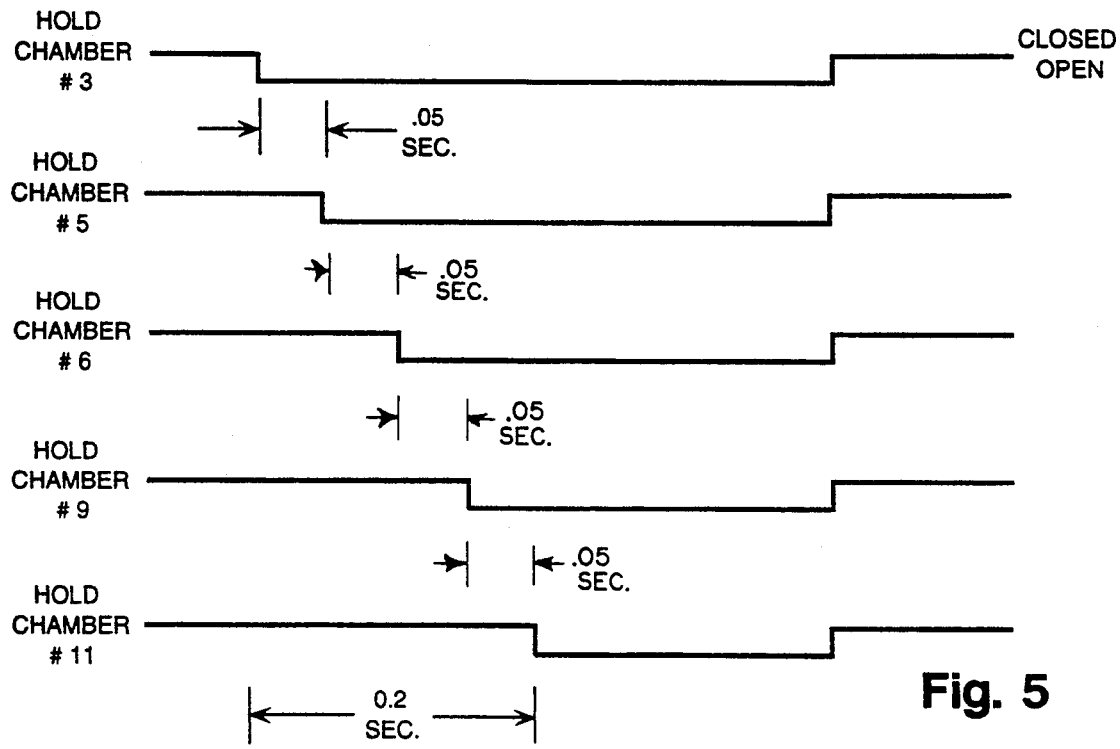
FIG. 5 is a timing diagram, for one embodiment, of the staggered discharge of this invention.

Referring now to FIG. 5, a timing diagram for the above example, as applied to the first embodiment of this invention is illustrated. In FIG. 5, a time line is shown for each of the five (5) holding chambers that are included in the best combination. In this example, the total package weight is 10 ounces: holding chamber #3 has 3.0 ounces of product, #5 has 1.0 ounce of product, #6 has 2.3 ounces of product, #9 has 1.9 ounces of product and #11 has 2.6 ounces of product. Holding chamber #3 is the heaviest and will be discharged first. Holding chamber #5 is the lightest and the discharge of this chamber will begin 0.05 seconds after the commencement of the discharge of chamber #3. Holding chamber #6 is the third heaviest holding chamber and therefore it will be discharged third, starting 0.05 seconds after the discharge commencement of holding chamber #5. Holding chamber #9 is the second lightest and will be discharged fourth, commencing 0.05 seconds after the discharge of chamber #6 began. Finally, holding chamber #11 is the second heaviest and will be the last holding chamber to be discharged. Holding chamber #11 will commence discharging 0.05 seconds after holding chamber #9 began discharging. As a result, all five holding chambers that were included in the best combination have commenced discharging in the total staggered discharge time S of 0.20 seconds. As shown in the timing diagram, all holding chamber discharge doors close at the same time; however, this fact is not relevant to the logic of this invention.

In a second embodiment of this invention, the time delays between product batches are not equal but rather are dependent upon the relative weight of the discharge made immediately before the discharge. This embodiment further enhances the distribution of the product throughout the available stagger discharge time. The same example that was used above will be used to demonstrate the second embodiment. As in the previous example, the holding chambers will be discharged in this order. The variable time delay (VTD) can be calculated by multiplying the total stagger discharge time S by the weight of the product in a holding chamber immediately prior to the delay divided by the total package weight minus the weight of the product in the holding chamber that will be discharged last. Instructions to make this calculation may be written into the software that runs on the computer system 50. In accordance with this formula the VTD following the discharge of holding chamber #3 is 0.20 times 3.0, divided by 7.4 (10.0–2.6), which is equal to 0.081 seconds. Applying the formula to the other holding chambers, the VDT following the discharge of holding chamber #5 is 0.027 seconds, following the discharge of holding chamber #6 is 0.062 seconds and following the discharge of holding chamber #9 is 0.030 seconds. As in the first embodiment all five holding chambers have commenced discharging 0.20 seconds after the first chamber began its discharge. The difference between the first and second embodiment is that in the second embodiment the VTD after the discharge of heavy holding chambers is longer than after the discharge of light holding chambers. It should be understood that this invention is not limited to the use of this. precise formula since other equivalent formulas that accomplish substantially the same results can obviously be devised.

Figure 6:
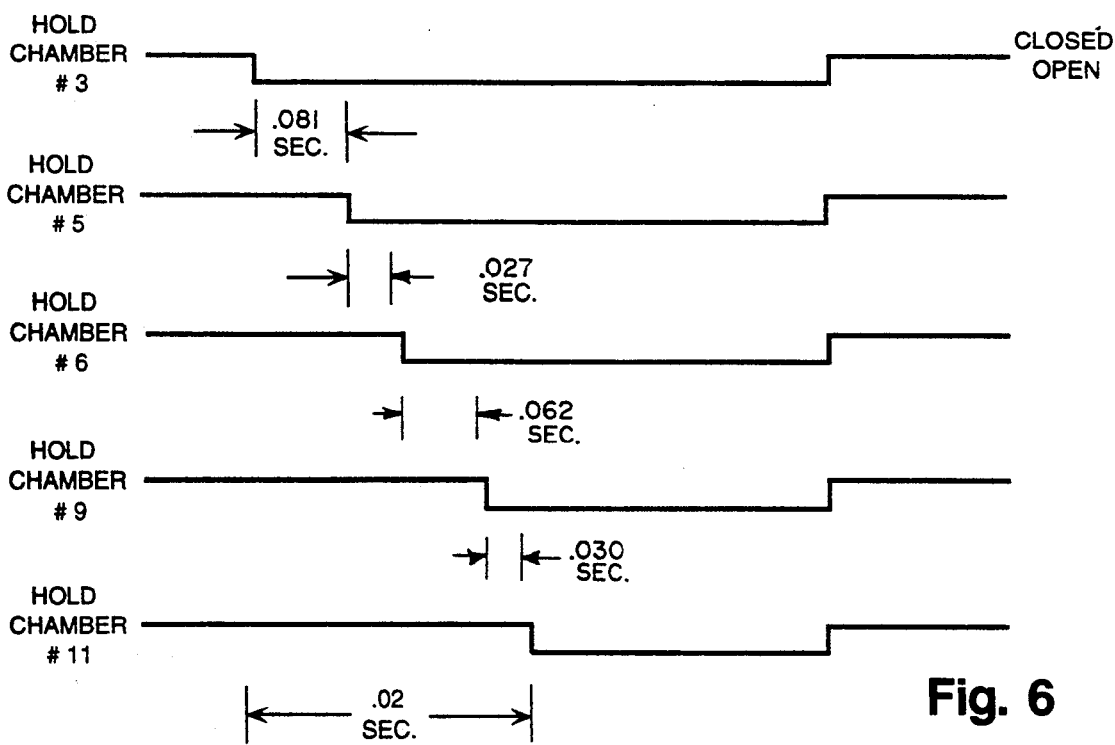
FIG. 6 is a timing diagram, for another embodiment, of the staggered discharge of this invention.

Referring now to FIG. 6, a timing diagram for the above example as applied to the second embodiment of this invention is illustrated. In this figure, a time line is shown for each of the five (5) holding chambers that are included in the best combination. A comparison of FIGS. 5 and 6 illustrate the different results between applicant's first and second embodiment. In the FIG. 5 embodiment there is a 0.05 second delay after the discharge of holding chamber #3, which is the heaviest batch, until holding chamber #5 is discharged. In the FIG. 6 embodiment the delay after the discharge of holding chamber #3 has been increased from 0.05 seconds to 0.081 seconds. Also, in the FIG. 5 embodiment there is a 0.5 second delay after the discharge of holding chamber #5, which is the lightest batch, until holding chamber #6 is discharged. In the FIG. 6 embodiment the delay after the discharge of holding chamber #5 has been decreased from 0.05 seconds to 0.027 seconds. However, in both the FIG. 5 and the FIG. 6 embodiment the total discharge time of 0.20 seconds is equal.

Although the invention has been described above by reference to preferred embodiments thereof, it will be appreciated that the foregoing and other changes may be made without departing from the scope and spirit of the invention as defined by the claims appended hereto.

I claim:

1. A combination weighing machine comprising:
   a plurality of holding chambers;
   a plurality of weighing devices associated with respective ones of said holding chambers, for weighing batches of product that are then stored in each of said holding chambers;
   a machine control including a combination computing and selecting unit adapted to compute combinations based on weight values supplied by each of said weighing devices and to select a best combination from the computed combinations and including a discharge control unit for causing the holding chambers that comprise said best combination to discharge their product into a collection device;
   said discharge control unit causing said selected holding chambers to discharge their product into said collecting hopper in either a weight sensitive sequenced order, a weight sensitive timing between batches order or a combination of these orders.

2. The invention as set forth in claim 1, wherein a predetermined total discharge time is established and said combination computing and selecting unit determines how many product batches are included in said best combination, and divides the total discharge time by the number of product batches included in said best combination minus one to determine an equal delay time for discharging each individual product batch.

3. The invention as set forth in claim 1, wherein the improvement further comprises:
   said machine control including a device through which a predetermined total discharge time can be established;
   said combination computing and selecting unit determining how many product batches are included in said best combination,
   said machine control including a device for determining the delay time after commencing the discharge of a particular batch until the discharge of the next batch which:
   (1) divides the total discharge time by a number obtained when the weight of the best combination is decreased by the weight of the last product batch to be discharged in the best combination sequence; and
   (2) multiplies the quotient obtained in (1) by the weight of said particular batch.

4. A combination weighing machine comprising:
   product batch handling units that process product in a plurality of paths to provide a corresponding plurality of measured, individual batches of product, each of said product batch handling units including a weighing device for measuring the weights of each individual batch, a memory for storing the measured weight and at least one holding chamber for storing the weighed batches;
   a combination computing and selecting unit for selecting from said stored batches of product a specific best combination of product batches which provides a total weight satisfying a predetermined condition;

a discharge control unit for causing the holding chambers to sequentially discharge the stored batches making up the best combination in either a weight sensitive sequenced order, a weight sensitive timing between batches order or a combination of these orders.

5. The invention as set forth in claim 4, wherein the improvement further comprises:
   a device for establishing a predetermined total discharge time;
   said combination computing and selecting unit determining how many product batches are included in said best combination, and dividing the total discharge time by the number of product batches included in said best combination minus one to determine an equal delay time for discharging each individual product batch.

6. The invention as set forth in claim 4, wherein the improvement further comprises:
   a device for establishing a predetermined total discharge time;
   a mechanism that determines how many product batches are included in said best combination;
   a device for determining the delay time after commencing the discharge of a particular batch until the discharge of the next batch which:
   (1) divides the total discharge time by a number obtained when the weight of the best combination is decreased by the weight of the last product batch to be discharged in the best combination sequence; and
   (2) multiplies the quotient obtained in (1) by the weight of said particular batch.

7. A combination weighing machine that meters out package weight quantities of solid product from a stream of bulk product, each package weight quantity complying with a predetermined package target weight limitation, comprising:
   a distribution disc having a center and an upper surface, said distribution disc being located relative to an external bulk product source such that it receives a flow of bulk product on its upper surface;
   a drive transmitting a motion to said distribution disc thereby causing the distribution disc to impart a radially outward directional movement to product deposited thereon;
   a plurality of feeder troughs, each having a receiving and a discharge end, extending in a radial-outward direction from the center of said distribution disc, the receiving ends of the feeder troughs located relative to said distribution disc such that product that moves radially outward from the distribution disc is deposited at the receiving ends of said feeder troughs;
   a plurality of drives each operatively connected with one of said feeder troughs and being selectively actuated to cause said feeder trough to advance product from said receiving end to said discharge end;
   a plurality of accumulation chambers positioned relative to said feed troughs such that product discharged from the feed troughs is received by the accumulation chambers;
   a plurality of weighing devices, each including a weigh bucket and or a holding chamber, for weighing or counting product introduced thereto;
   said accumulation chambers having independently operable discharge control units that when actuated cause the product in the accumulation chambers to flow into its associated weigh bucket;
   a combination computing unit adapted to compute the combinations, based on weight values supplied to it by each of said weighing devices, that meets the package target weight limitations and select a best combination;
   a discharge control unit for causing selected holding chambers to discharge their product;
   a collecting hopper for collecting the product discharged from said selected holding chambers; and
   said discharge control unit causing said selected holding chambers to discharge their product into said collecting hopper in either a weight sensitive sequenced order, a weight sensitive timing between batches order or a combination of these orders.

8. The invention as set forth in claim 7, wherein the improvement further comprises:
   a device for establishing a predetermined total discharge time;
   said combination computing unit determines how many product batches are included in said best combination, and divides the total discharge time by the number of product batches included in said best combination minus one to determine an equal delay time for discharging each individual product batch.

9. The invention as set forth in claim 7, wherein the improvement further comprises:
   a device for establishing a predetermined total discharge time; a mechanism that determines how many product batches are included in said best combination;
   a device for determining the delay time after commencing the discharge of a particular batch until the discharge of the next batch which:
   (1) divides the total discharge time by a number obtained when the weight of the best combination is decreased by the weight of the last product batch to be discharged in the best combination sequence; and
   (2) multiplies the quotient obtained in (1) by the weight of said particular batch.

10. A combination weighing machine that meters out package weight quantities of solid product from a stream of bulk product, each package weight quantity complying with a predetermined package target weight limitation, comprising:
    a distribution device located relative to an external bulk product source such that it receives a flow of bulk product;
    a drive transmitting a motion to said distribution device thereby causing the distribution device to impart movement to product deposited thereon;
    a plurality of feeder troughs, each having a receiving and discharge ends, the receiving ends of the feeder troughs located relative to said distribution device such that product that moves from the distribution device is deposited at the receiving ends of said feeder troughs;
    a plurality of drives each operatively connected with one of said feeder troughs and being selectively actuated to cause said feeder trough to advance product from said receiving end to said discharge end;

a plurality of accumulation chambers positioned relative to said feed troughs such that product discharged from the feed troughs is received by the accumulation chambers;

a plurality of weighing devices, each including a weigh bucket and or a holding chamber, for weighing or counting product introduced thereto;

said accumulation chambers having independently operable discharge control units that when actuated cause the product in the accumulation chambers to flow into its associated weigh bucket;

a combination computing unit adapted to compute the combinations, based on weight values supplied to it by each of said weighing devices,.that meets the package target weight limitations and select a best combination;

a discharge control unit for causing selected holding chambers to discharge their product;

a collecting hopper for collecting the product discharged from said selected holding chambers; and said discharge control unit causing said selected holding chambers to discharge their product into said collecting hopper in either a weight sensitive sequenced order, a weight sensitive timing between batches order or a combination of these orders.

11. The invention as set forth in claim 10, wherein the improvement further comprises:

a device for establishing a predetermined total discharge time;

said combination computing unit determines how many product batches are included in said best combination, and divides the total discharge time by the number of product batches included in said best combination minus one to determine an equal delay time for discharging each individual product batch.

12. The invention as set forth in claim 10, wherein the improvement further comprises:

a device for establishing a predetermined total discharge time; a mechanism that determines how many product batches are included in said best combination;

a device for determining the delay time after commencing the discharge of a particular batch until the discharge of the next batch which:

(1) divides the total discharge time by a number obtained when the weight of the best combination is decreased by the weight of the last product batch to be discharged in the best combination sequence; and (2) multiplies the quotient obtained in (1) by the weight of said particular batch.

13. A method of metering out a package weight quantity of product having predetermined package target weight limitations from a stream of bulk product comprising the steps of:

(a) directing the stream of bulk product such that it is delivered to a distribution device;

(b) transmitting motion to said distribution device thereby causing the distribution device to impart movement to the bulk product that has been deposited thereon;

(c) locating a plurality of weight determining means, each including a weigh bucket, relative to said distribution device such that individual batches of product are discharged into weigh buckets;

(d) weighing the contents of the product received in step (c) and record this weight such that the weight of a particular batch of product can be associated therewith;

(e) computing the total weight of all package combinations;

(f) selecting a best combination from all the package combinations computed in (e) using the predetermined package target weight limitations as the criteria for making this selection;

(g) discharging the batches of product making up the best combination into a collecting hopper in either a weight. sensitive sequenced order, a weight sensitive timing between batches order or a combination of these orders.

14. The invention as set forth in claim 13, including the following additional steps:

(h) determining a total discharge time for completing the discharge of all batches making up the best combination;

(i) determining how many individual batches are included in said best combination; and (j) dividing the total discharge time by the number of product batches included in the best combination minus one to determine the delay time between all batch discharge commencements.

15. The invention as set forth in claim 13, including the following additional steps:

(k) determining the total weight of the best combination;

(l) determining the weight of the product batch that will be discharge last in the best combination sequence;

(m) determining how many individual batches are included in the best combination;

(n) determining a total discharge time for completing the discharge of all batches making up the best combination;

(o) dividing the total discharge time by the number obtained when the total weight of the best combination is decreased by the weight of the last product batch to be discharged in the best combination sequence; and (p) multiplying the quotient obtained in (o) by the weight of a particular batch to establish the time delay between commencing discharge of said particular batch and commencing discharge of the next batch of product in the sequence.

16. A method of metering out a package weight quantity of product having predetermined package target weight limitations from a stream of bulk product comprising the steps of:

(a) directing the stream of bulk product such that it is delivered to a distribution device;

(b) transmitting a motion to said distribution device thereby causing the distribution device to impart movement to the bulk product that has been deposited thereon;

(c) locating a plurality of feeder troughs, having receiving and discharge ends, such that the receiving ends of the feeder troughs are located relative to said distribution device that product moving from the distribution device is deposited at the receiving ends of the feeder troughs;

(d) locating a plurality of accumulation chambers relative to the discharge ends of said feed troughs such that product discharged from the feed troughs is received by the accumulation chambers;

(e) selectively actuating individual feed troughs to advance product from said receiving end toward said discharge end to meter a batch of product into an accumulation chamber;

(f) locating a plurality of weight determining means, each including a weigh bucket, relative to the accumulation chambers such that the contents of an individual accumulation chamber can be discharged into a weigh bucket;

(g) selectively discharging the batch of product contained in an accumulation chamber into a cooperating weigh bucket that is empty;

(h) weighing the contents of the product received in step (g) and record this weight such that the weight of a particular batch of product can be associated therewith;

(i) computing the total weight of all package combinations;

(j) selecting a best combination from all the package combinations computed in (i) using the predetermined package target weight limitations as the criteria for making this selection;

(k) discharging the batches of product making up the best combination into a collecting hopper in either a weight sensitive sequenced order, a weight sensitive timing between batches order or a combination of these orders.

17. The invention as set forth in claim 16, including the following additional steps:

(l) determining a total discharge time for completing the discharge of all batches making up the best combination;

(m) determining how many individual batches are included in said best combination; and (n) dividing the total discharge time by the number of product batches included in the best combination minus one to determine the delay time between all batch discharge commencements.

18. The invention as set forth in claim 16, including the following additional steps:

(o) determining the total weight of the best combination;

(p) determining the weight of the product batch that will be discharge last in the best combination sequence;

(q) determining how many individual batches are included in the best combination;

(r) determining a total discharge time for completing the discharge of all batches making up the best combination;

(s) dividing the total discharge time by the number obtained when the total weight of the best combination is decreased by the weight of the last product batch to be discharged in the best combination sequence; and (t) multiplying the quotient obtained in (s) by the weight of a particular batch to establish the time delay between commencing discharge of said particular batch and commencing discharge of the next batch of product in the sequence.

19. A method of metering out a package weight quantity of product having predetermined package target weight limitations from a stream of bulk product comprising the steps of:

(a) directing the stream of bulk product such that it is delivered to the center of a distribution disc;

(b) transmitting a nutating motion to said distribution disc thereby causing the distribution disc to impart a radial-outward directional movement to the bulk product that has been deposited thereon;

(c) locating a plurality of radially extending feeder troughs, having receiving and discharge ends, around the periphery of the distribution disc, such that the receiving ends of the feeder troughs are located relative to said distribution disc that product moving radially outward over the peripheral edge of the distribution disc is deposited at the receiving ends of the feeder troughs;

(d) locating a plurality of accumulation chambers relative to the discharge ends of said feed troughs such that product discharged from the feed troughs is received by the accumulation chambers;

(e) selectively vibrating individual feed troughs to advance product from said receiving end toward said discharge end to meter a batch of product into an accumulation chamber;

(f) locating a plurality of weight determining means, each including a weigh bucket, relative to the accumulation chambers such that the contents of an individual accumulation chamber can be discharged into a weigh bucket;

(g) selectively discharging the batch of product contained in an accumulation chamber into a cooperating weigh bucket that is empty;

(h) weighing the contents of the product received in step (g) and record this weight such that the weight of a particular batch of product can be associated therewith;

(i) computing the total weight of all package combinations;

(j) selecting a best combination from all the package combinations computed in (i) using the predetermined package target weight limitations as the criteria for making this selection;

(k) discharging the batches of product making up the best combination into a collecting hopper in either a weight sensitive sequenced order, a weight sensitive timing between batches order or a combination of these orders.

20. The invention as set forth in claim 19, including the following additional steps:

(l) determining a total discharge time for completing the discharge of all batches making up the best combination;

(m) determining how many individual batches are included in said best combination; and (n) dividing the total discharge time by the number of product batches included in the best combination minus one to determine the delay time between all batch discharge commencements.

21. The invention as set forth in claim 19, including the following additional steps:

(o) determining the total weight of the best combination;

(p) determining the weight of the product batch that will be discharge last in the best combination sequence;

(q) determining how many individual batches are included in the best combination;

(r) determining a total discharge time for completing the discharge of all batches making up the best combination;

(s) dividing the total discharge time by the number obtained when the total weight of the best combination is decreased by the weight of the last product batch to be discharged in the best combination sequence; and (t) multiplying the quotient obtained in (s) by the weight of a particular batch to establish the time delay between commencing discharge of said particular batch and commencing discharge of the next batch of product in the sequence.

* * * * *